US006759636B2

(12) United States Patent
Stutman

(10) Patent No.: US 6,759,636 B2
(45) Date of Patent: Jul. 6, 2004

(54) MOBILE MICROWAVE OVEN

(76) Inventor: Peter S Stutman, 27 Lillian Ave., Sudbury, MA (US) 01776

( * ) Notice: Subject to any disclaimer, the term of this patent is extended or adjusted under 35 U.S.C. 154(b) by 201 days.

(21) Appl. No.: 09/751,893

(22) Filed: Dec. 29, 2000

(65) Prior Publication Data
US 2002/0153370 A1 Oct. 24, 2002

Related U.S. Application Data
(60) Provisional application No. 60/173,679, filed on Dec. 29, 1999.

(51) Int. Cl.[7] ................................................ H05B 6/80
(52) U.S. Cl. ...................... 219/679; 219/722; 219/756; 219/715; 219/739
(58) Field of Search ................. 219/756, 757, 219/679, 702, 720, 722, 739, 762, 763, 719, 715

(56) References Cited

U.S. PATENT DOCUMENTS

| 2,888,542 | A | * | 5/1959 | Mork | 219/756 |
| 4,349,713 | A | * | 9/1982 | Marsen | 219/739 |
| 4,412,388 | A | * | 11/1983 | Takagi et al. | 34/259 |
| 4,517,429 | A | * | 5/1985 | Horinouchi | 219/708 |
| 4,667,075 | A | * | 5/1987 | Sakarai | 219/716 |
| 4,786,774 | A | * | 11/1988 | Kaminaka | 219/757 |
| 5,070,223 | A | * | 12/1991 | Colasante | 219/759 |
| 5,235,150 | A | * | 8/1993 | Buske et al. | 219/756 |
| 5,276,300 | A | * | 1/1994 | Low et al. | 219/715 |
| 5,290,985 | A | * | 3/1994 | Jancic et al. | 219/725 |
| 5,347,109 | A | * | 9/1994 | Nakabayashi et al. | 219/762 |
| 5,369,255 | A | * | 11/1994 | Sherer et al. | 219/756 |
| 5,551,616 | A | * | 9/1996 | Stitt et al. | 224/275 |
| 5,973,917 | A | * | 10/1999 | White | 361/683 |
| 6,060,700 | A | * | 5/2000 | Perlman et al. | 219/756 |

FOREIGN PATENT DOCUMENTS

| JP | 59-35726 | * | 2/1984 | 219/756 |
| JP | 5-44943 | * | 2/1993 | 219/756 |

* cited by examiner

Primary Examiner—Philip H. Leung

(57) ABSTRACT

A low-power microwave oven for use in a vehicle has top entry to the heating chamber (120), is powered from the vehicle's cigarette lighter or accessory socket, and has the controls and display (60) and the cooling vents (80 and 110) also on the top surface of the oven. The oven is arranged to be secured to the seat by tits seat belt in such a manner that the oven will operate while so secured. There is also a spill container (141) in the heating chamber. Materials may be used that make the oven cabinet transparent or translucent.

20 Claims, 10 Drawing Sheets

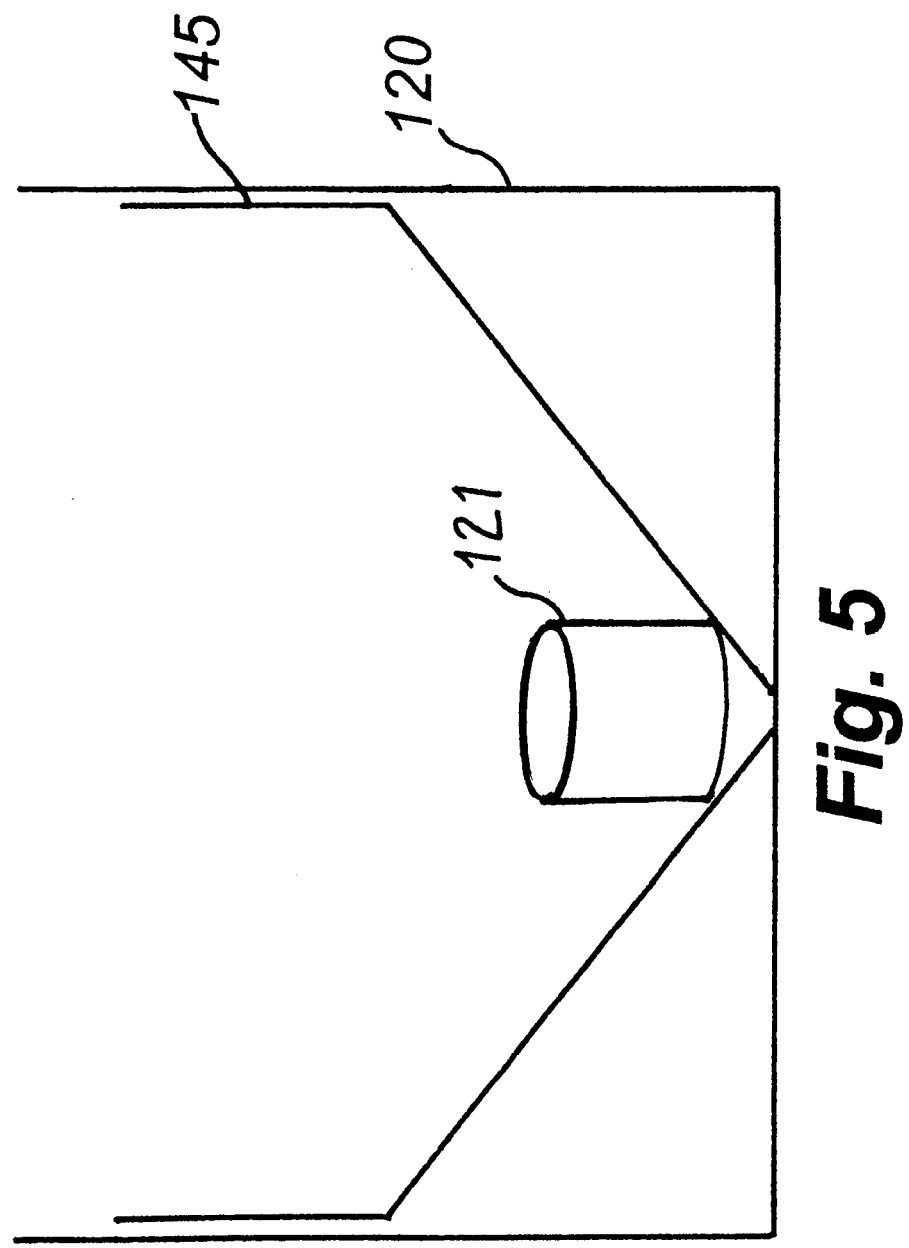

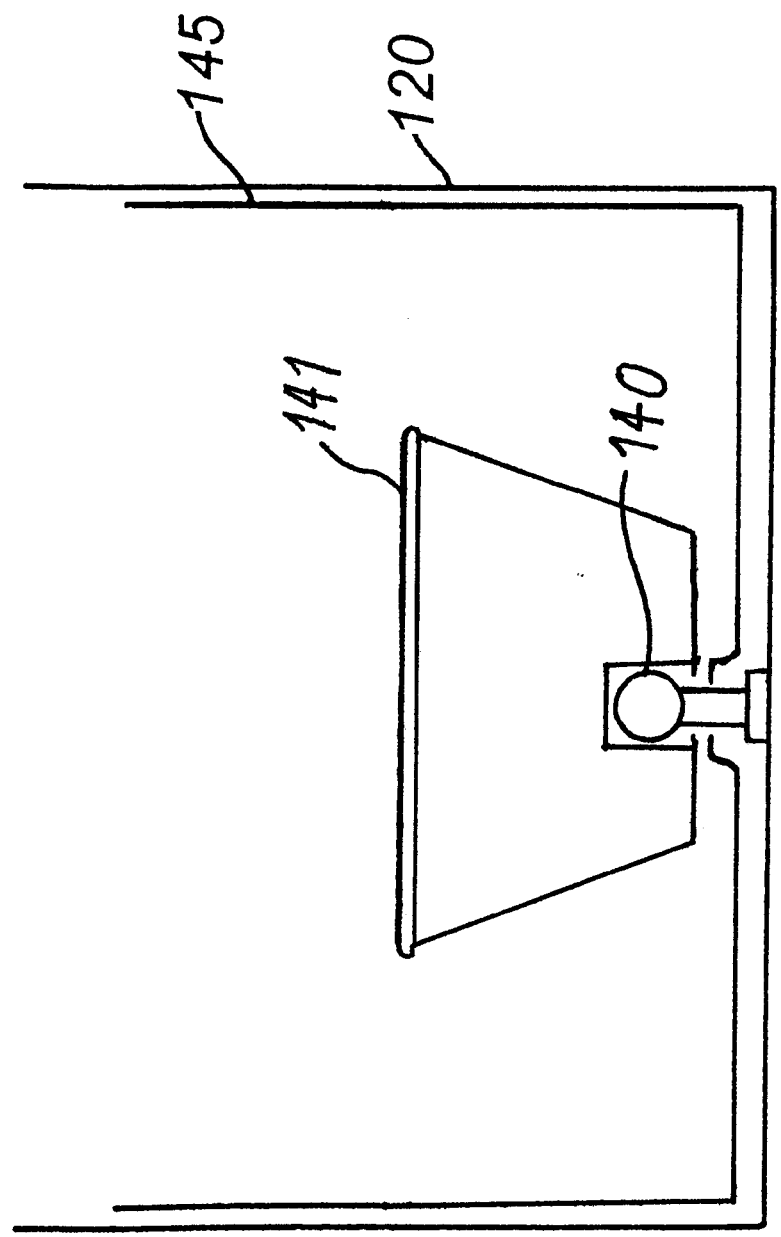

MOBILE MICROWAVE OVEN

CROSS-REFERENCE TO RELATED APPLICATION

The present application claims priority from U.S. Provisional Patent Application No. 60/173,679, filed Dec. 29, 1999, hereby incorporated herein by reference.

FIELD OF THE INVENTION

This invention generally relates to microwave ovens and more specifically to microwave ovens for use in vehicles such as cars, trucks, aircraft, and boats.

BACKGROUND OF THE INVENTION

Microwave ovens designed for portable operation and operation in vehicles have been proposed previously. U.S. Pat. No. 4,667,075 of Sakurai proposes using a three-phase AC alternator to supply power. U.S. Pat. No. 5,276,300 of Low et al. describes a microwave oven containing essentially an inverter to allow 12 volt DC operation. AGOR technologies of Verson, France manufactures a similar product. These devices, operated at power levels of about 0.6–1.0 kW nominal, require DC input currents from a 12 volt source of approximately 100 amperes. This much current requires direct connection to the vehicle battery with very heavy gauge wire or the dedicated alternator of Sakurai and implies mechanical and electrical installation skills beyond the range of the average consumer. The oven must also be somehow mounted to the vehicle so that it does not move around. The microwave ovens previously described are mechanically very similar. They feature a cavity with a front opening door, that is, with a vertical hinge. The timer and control keypad is mounted vertically in proximity to the door and is very similar to or modifications of conventional consumer microwave ovens.

Conventional consumer microwave ovens have power ratings in the 500 W–1000 W range. These ratings represent the power delivered into the oven cavity. The nameplate power consumption of these microwave ovens is typically 50–75% higher. For example a Magic Chef MC-03JS Compact Microwave oven is rated at 500 Watts and is rated at a power consumption of 750 Watts. While these ovens could be powered by a DC to AC inverter of appropriate output, the inverter would have to be hardwired with heavy gauge wire, such as No. 0, to the vehicle battery or alternator in order to receive the necessary current. If we assume a 90% inverter efficiency the 500 Watts oven mentioned above would cause a typical inverter to draw a current of about 60 amperes at a nominal 13.8 volts.

SUMMARY OF THE INVENTION

This invention provides a small, low-power, magnetron-type microwave oven. The power is often less than 300 Watts, typically in the vicinity of 200 Watts. The microwave oven described herein is designed to be powered by a vehicle's "accessory power" or "cigarette lighter" jack and to be held in place on a seat by a standard vehicle seat-belt. Also described is an upward-opening door and plastic radio-transparent microwave cavity liner designed to contain spilled foods and facilitate cleaning. Methods of retaining food containers which hold the foods being heated, as well as other safety and convenience features useful for real-world operation in the mobile environment, are described.

It is envisioned that the device described will find wide application in cars, trucks, recreational vehicles, aircraft, boats and simple living situations which do not provide conventional AC mains and in which consumers are unlikely to perform, or have performed, involved installations. It can be used for many tasks, from heating baby bottles and meals in properly designed containers, to heating the morning's coffee, to warming automotive gasket materials in cold climates during repair operations.

In one embodiment, a high frequency switching power supply generates the required filament and high voltage necessary for magnetron operation. This is more efficient than suffering DC/AC inverter losses in addition to the losses seen in typical prior art microwave oven power transformers. The magnetron is the type whose magnetic field is generated by permanent magnets.

The only readily available electrical outlet or jack in most modern cars and trucks and smaller boats is the familiar "cigarette lighter" or "accessory power" socket. This socket is familiar to millions of users who power mobile phones, radar detectors, small inverters and other convenience devices from them. These jacks are typically fused at 15–30 amperes. This typically limits total electrical power input to the microwave oven described here to a range of approximately 200–400 Watts. This corresponds to a typical microwave power rating of about 125–250 Watts. Most users of microwave ovens are used to larger power inputs as mentioned previously. Therefore the cooking time in this low power microwave oven will be longer than the "standard" times experienced in larger, more powerful units. For example, if it takes 1 minute to heat a cup of soup to serving temperature in a 750 Watt microwave oven found in a typical American kitchen, it will take three minutes nominally in a 250 Watt unit. In fact, given the significant increase in cooking times, there will be thermal losses including radiational and convective losses which will tend to cool the food being heated and which will lengthen the required time beyond the simple ratio of power. In one mode, the microwave oven described here takes the "standard" cooking time for a 750–900 Watt microwave oven and automatically multiplies it by an appropriate factor to arrive at the correct heating time for this lower-power oven. In another mode, the user enters a desired heating interval which is not multiplied by any factor.

The present microwave oven also preferably senses input current and voltage. It shuts down if excessive current is drawn to protect the "accessory socket" fuse or if voltage drops to a level just above that which corresponds to the vehicle battery being unable to start the vehicle.

A microwave oven, even a small one, is a substantial mass, and may contain foods which are near or at the boiling point. It must be securely mounted within the vehicle cockpit, such that in case of an emergency maneuver, sudden acceleration, or crash, it does not fly about the cockpit causing injury or burn hazards to passengers or damaging other components of the vehicle. The present microwave oven typically has split loops affixed to the outside of the cabinet which facilitate securing the microwave oven in a seat with the seatbelt much as a child's safety seat would. In the event of a collision the microwave oven described here shuts down. It also has the usual safety features such as door interlocks and over-temperature sensors found in virtually all consumer microwave ovens. Conventional mounting points are provided for situations in which the device may be bolted down.

The intake and exhaust for the cooling air required by the magnetron are also preferably placed on the top surface such that the airflow is not impeded as it would be if mounted on a seat with downward or side facing intakes and exhausts. The keypad is also mounted on the top surface for easy access.

The microwave oven described herein also normally has an upward opening door allowing access to the oven cavity. The cavity preferably has a radio-transparent, removable, easily cleaned, plastic liner made of heat resistant plastic which contains any spills which may occur. These two features help insure that, even if food somehow should spill within the oven, it will not leak out into the vehicle cabin. The door is preferably retained shut by a locking mechanism when the oven is in operation and may stay in that state until an unlock button is pushed on the unit's keypad.

Since the vehicle may be in motion while the microwave oven of the invention is in use, means are typically provided of fixing the food container in place so that it does not "bounce around" and spill its contents or damage the cavity walls. In one embodiment, a detented stud is centrally affixed to the center of the carousel. There are mating cavities molded into "microwave safe" plastic heating containers with locking lids and appropriate vents. The food is placed into the container, the vented lid is affixed with a latching lip or similar arrangement, and the cavity, typically in the center of the container is pressed down onto the detented stud which retains it in place. Food portions in disposable heating containers, such as "Chef Boyardee® Lasagna, Microwave Meals, (10.5 oz. size)" can be heated with the appropriate mating cavity molded in.

Alternatively an inverted pyramidal well is molded into a radio-transparent, heat resistant plastic support sheet. Food in appropriate containers is placed down into the well until contact is made with the walls of the well. Alternatively a curved non-metallic spring-loaded radio-transparent wall could be used as retention device.

A carrying handle is typically molded into the top surface to facilitate handling of the mobile microwave oven. A DC input cable terminated in a "cigarette lighter" plug or other suitable connector of sufficient length and sufficient gauge is also typically provided so that the microwave oven can be installed in the back seat of long vehicles while being plugged into the "cigarette lighter" or "accessory socket" which is usually proximal to the vehicle's front seat.

BRIEF DESCRIPTION OF THE DRAWINGS

FIG. 5: Inverted Pyramidal Food Retainer and Cavity Liner

FIG. 5A: Food Container Retention Stud

DETAILED DESCRIPTION DESCRIPTION OF SYSTEM

Referring to FIGS. 1, 1A, 2, and 3, the LOW-POWER MOBILE MICROWAVE OVEN of the invention is typically placed on a passenger seat. On its top surface are the CONTROL KEYPAD AND DISPLAY (60), the magnetron COOLING AIR INTAKE (80) and OUTLET (110), and the upward opening microwave CAVITY DOOR (160) affixed by HINGE (150). The HINGE (150) can be positioned on any of the four sides of the CAVITY DOOR (160). The DOOR (160) seals the MICROWAVE CAVITY (120) so as to contain all microwave energy by means of conductive elastomeric GASKET (210) and conventional choke seal design. A carrying handle (not shown) may be molded into the top surface of the MICROWAVE OVEN.

The walls, including the CAVITY DOOR (160), that define the MICROWAVE CAVITY (120) are typically constructed of radio-reflecting material such as metal sheet. Alternatively, the housing formed with the cavity walls and DOOR (160) can be constructed of transparent or translucent material which allows viewing of the internal components and their construction.

Figure 6:
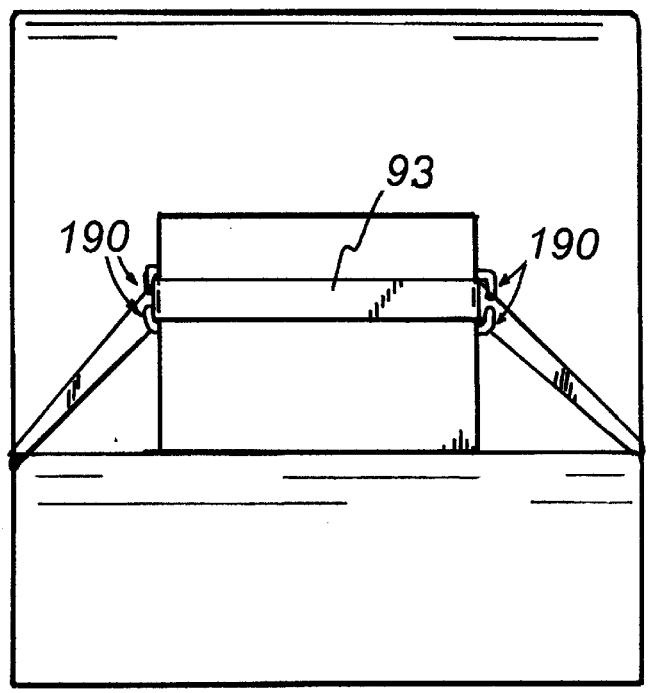
FIG. 6: View of Mobile Microwave Oven in Seat Retained by Seatbelt
Figure 7:
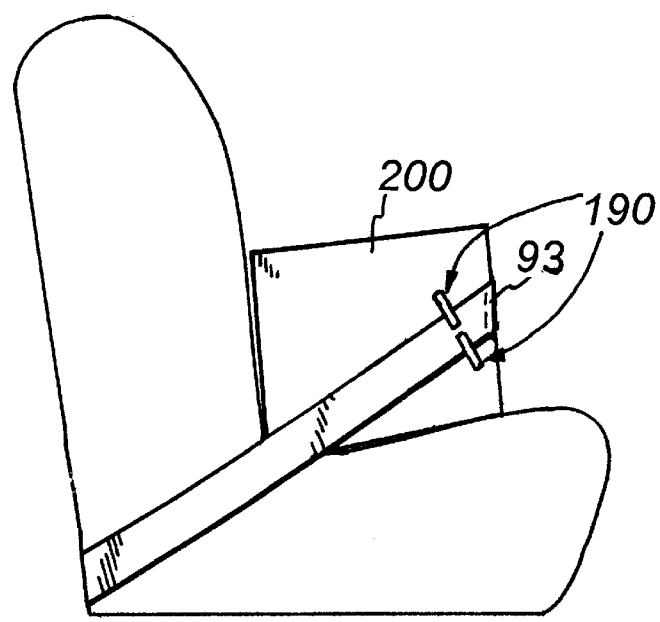
FIG. 7: Side View of Mobile Microwave Oven in Seat Retained by Seatbelt
Figure 8A:
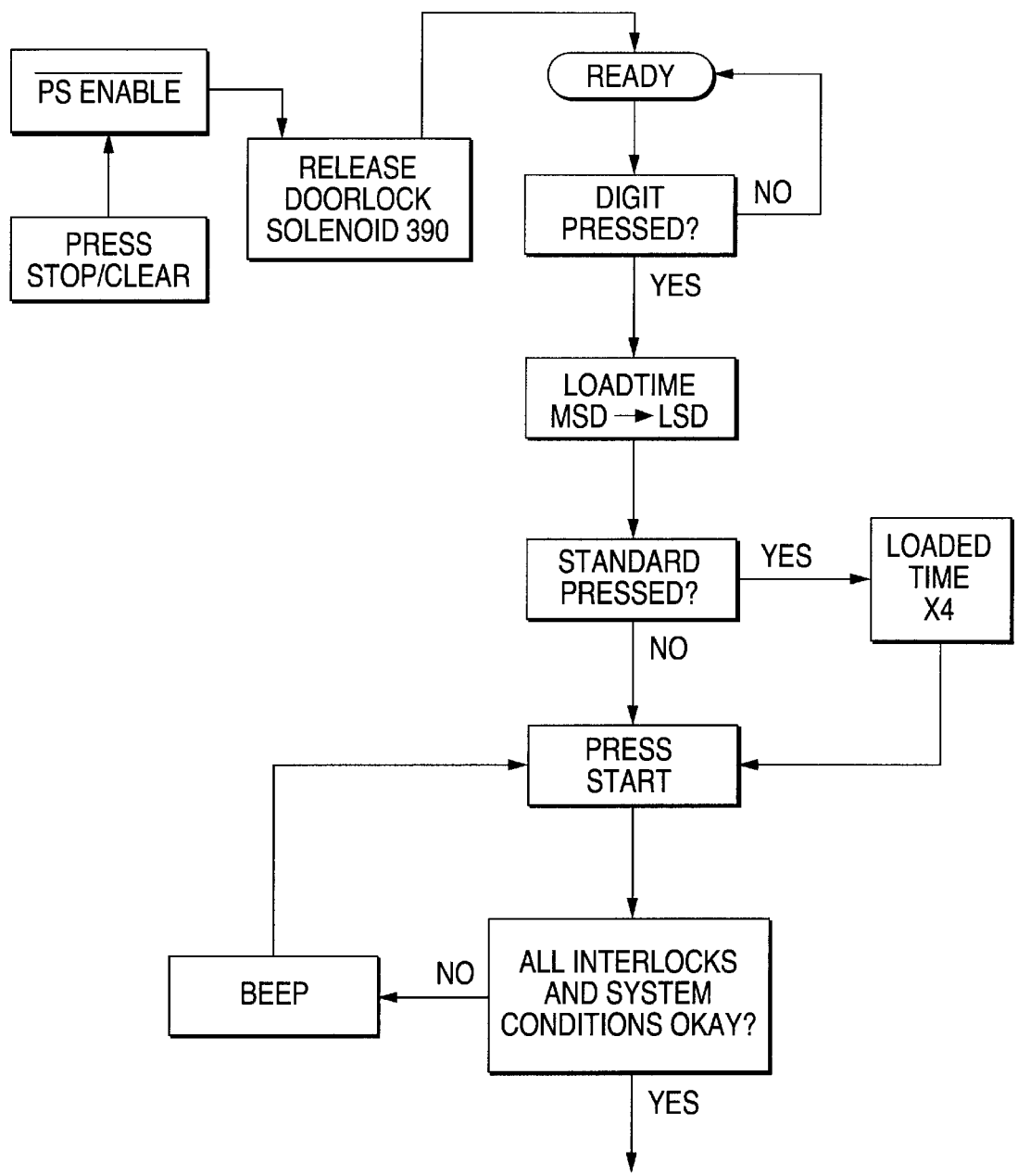
FIG. 8 (including FIG. 8a and FIG. 8b): Mobile Microwave Oven Operational Flowchart
Figure 8B:
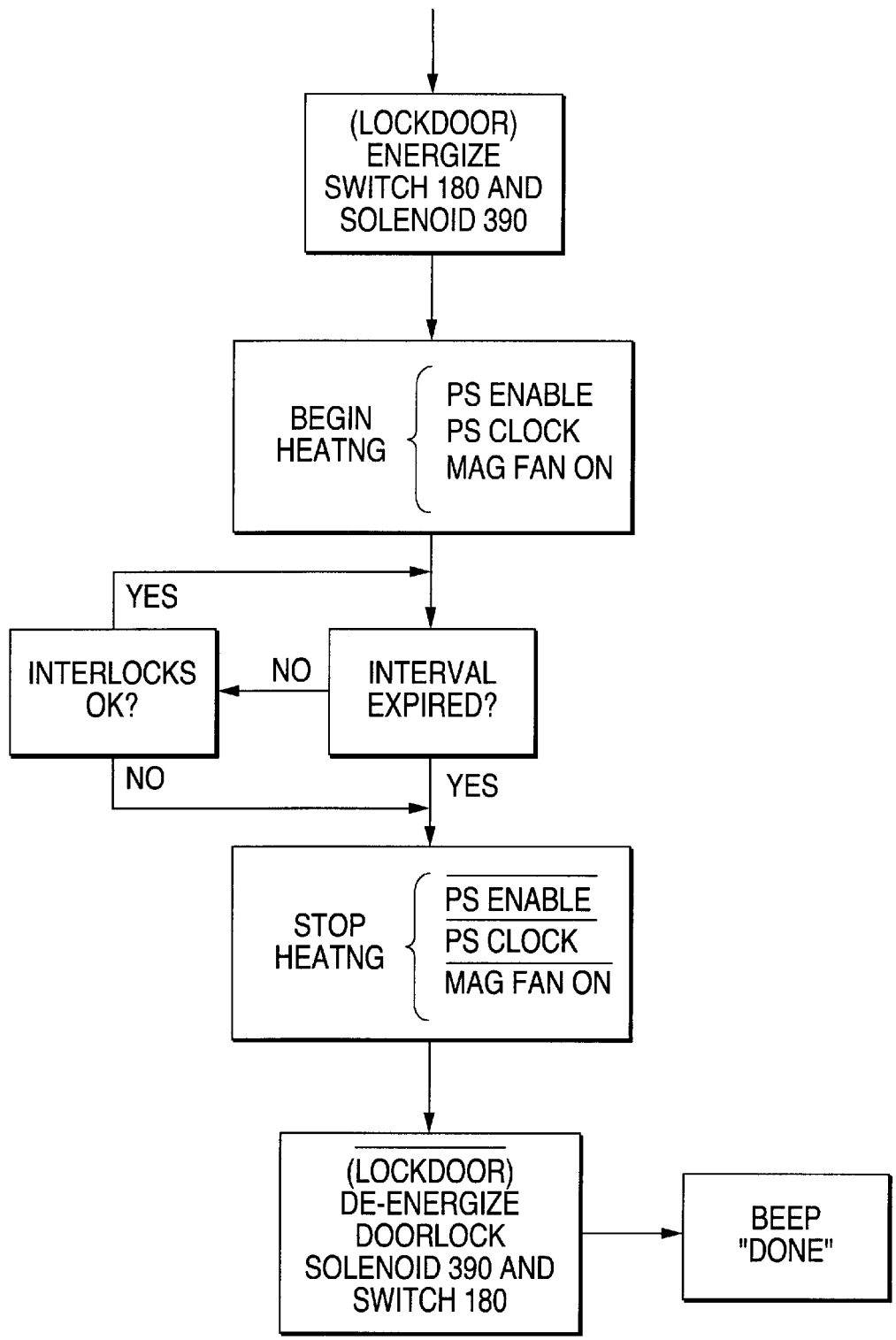

The mobile microwave oven CABINET (200) is secured in place on the seat by running the seatbelt for that seat through the SPLIT LOOPS (190) attached to the CABINET (200). The waist portion of the seatbelt is tightened to secure the CABINET (200) in place. The SPLIT LOOPS (190) are angled down from the vertical plane toward the seatback so as to facilitate force components acting on the CABINET (200) down toward the seat cushion and backward toward the seatback without kinking or narrowing of the belt where it passes through the SPLIT LOOPS (190). See FIGS. 6 and 7. This method is similar to that used to secure infant and child safety seats in vehicles. Alternatively, angle brackets and screws suitably attached to the CABINET (200) can be used to effect a permanent mounting.

Figure 4:
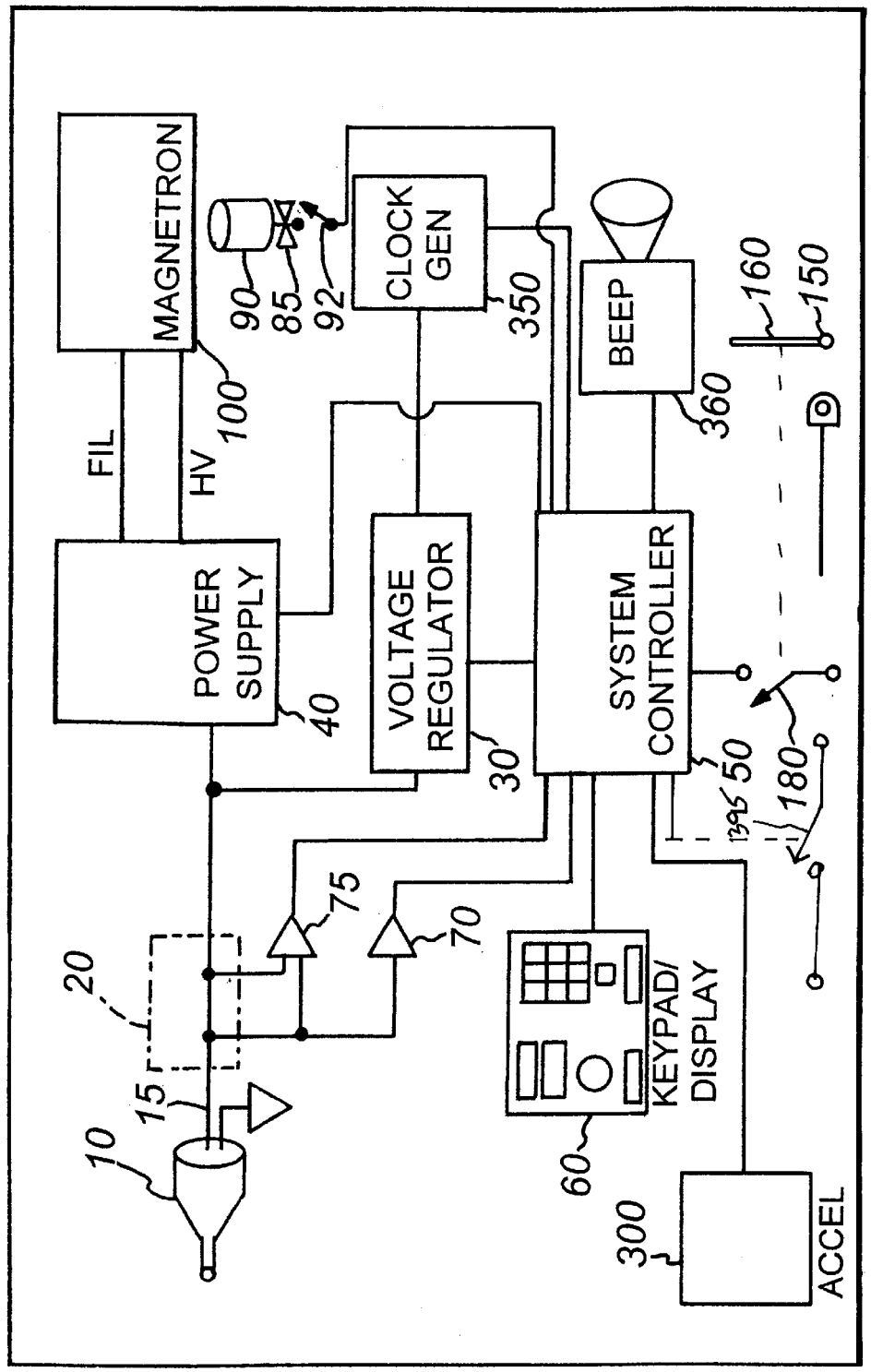
FIG. 4: Mobile Microwave Oven System Diagram

Referring to FIG. 4, the "cigarette lighter" or "accessory power socket" PLUG (10) is inserted into the vehicle's "CIGARETTE LIGHTER" or "ACCESSORY" socket. A two-conductor insulated POWER CABLE (15) of at least #8 gauge attached in series with the plug (10) brings power into the microwave oven's cabinet (200). This positive lead of this nominal 12 VDC power passes through the current sensing shunt (20) and is then bussed to the voltage regulator (30), the input of the switching power supply (40), and the input of the input voltage sensor comprised of A/D converter (70). It is also connected to the DC fan motor control switch (95) and the door locking solenoid switch (185), and the oven cavity lamp switch (125). The 12 VDC rating in a vehicle is nominal and is usually closer to 14 VDC when the vehicle engine is above idle speed.

The voltage regulator (30) is a simple series pass regulator which outputs +5 VDC at sufficient current to operate the system controller (50), the keypad/display (60) and associated components. Its devices have voltage ratings which are suitable for use in the automotive electrical environment and will survive the transients known to exist in this environment.

The switching power supply (40) is an inverter type switching power supply with a 12 VDC nominal input. It outputs the magnetron filament power, typically about 3 VDC at several amperes, as well as the B- voltage, typically about 2–4 kV and in this application about 75–100 mA at 2 kV. The exact voltages depend on the specific characteristics of the magnetron (100). The magnetron anode is typically grounded to the microwave oven case (200), and the cathode to anode potential necessary for operation is developed by depressing the isolated or "floating" cathode filament below ground potential with the negative voltage. The magnetic field of the magnetron (100) is generated by permanent magnets integral with its housing. While magnetrons operating at the typical 2450 MHz frequency have been used in a prototype of this microwave oven, other frequencies might be employed to optimize energy transfer into or energy modes in the microwave oven cavity. The switching power supply (40) utilizes inductive transformers whose wire windings, insulation and other mechanical construction produce satisfactory insulation and isolation so that the magnetron (100) filament can be safely floated, and so that the high voltage output is not compromised. The 3 VAC output is electrically floating and connected with wires with insulation of adequate voltage rating.

The switching power supply (40) operates at a frequency much higher than that of a typical AC line (60 Hz) and therefore requires less energy storage on the output. Consequently the power supply output can be keyed on and off very rapidly by means of the PS (Power Supply) ENABLE SIGNAL from the System Controller (50). In the preferred embodiment, the Power supply is driven by a PS (Power Supply) CLOCK generated in firmware by the SYSTEM CONTROLLER (50). Alternatively, a separate clock signal generator could be used.

Figure 1:
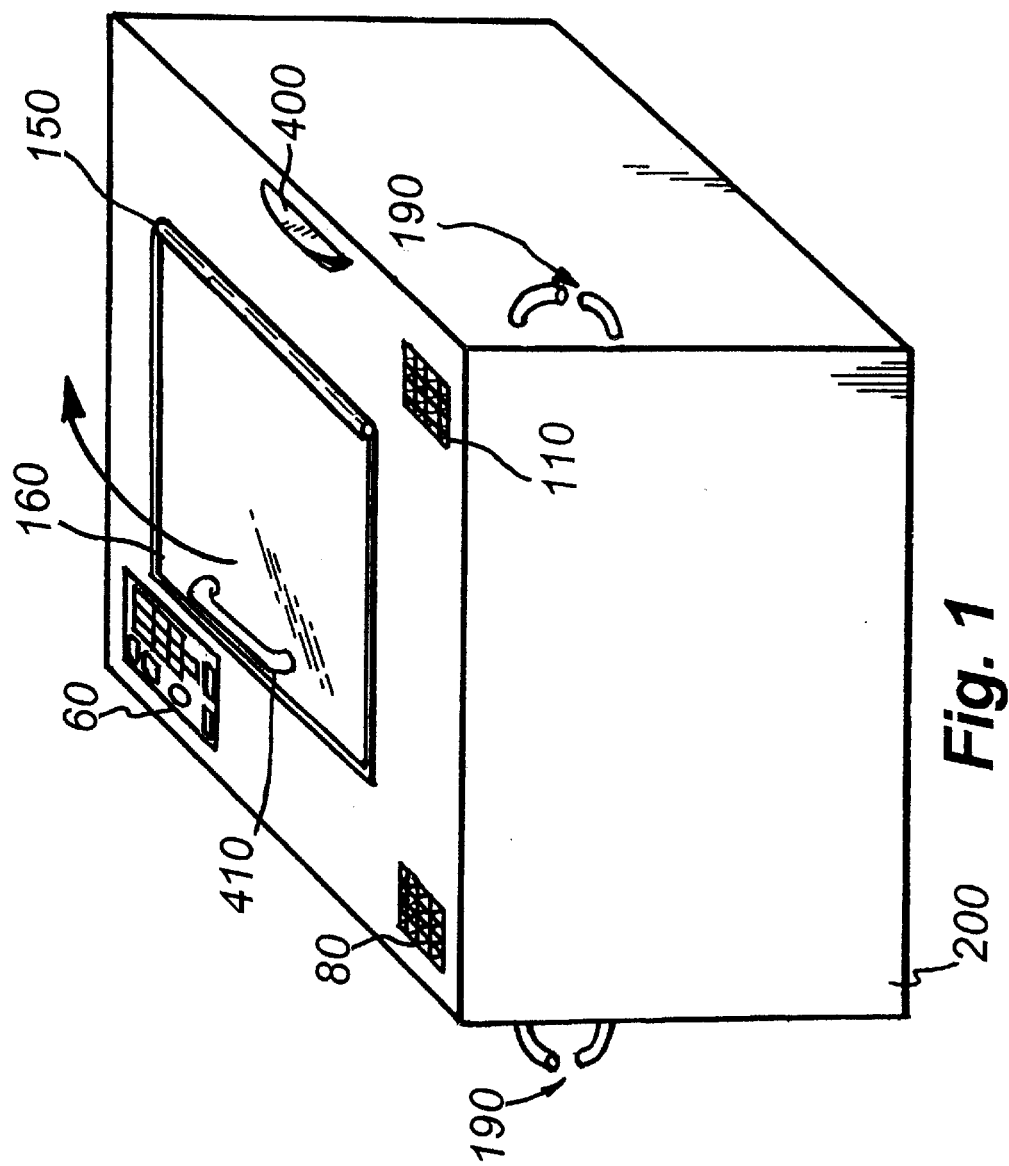
FIG. 1: Mobile Microwave Oven
Figure 1A:
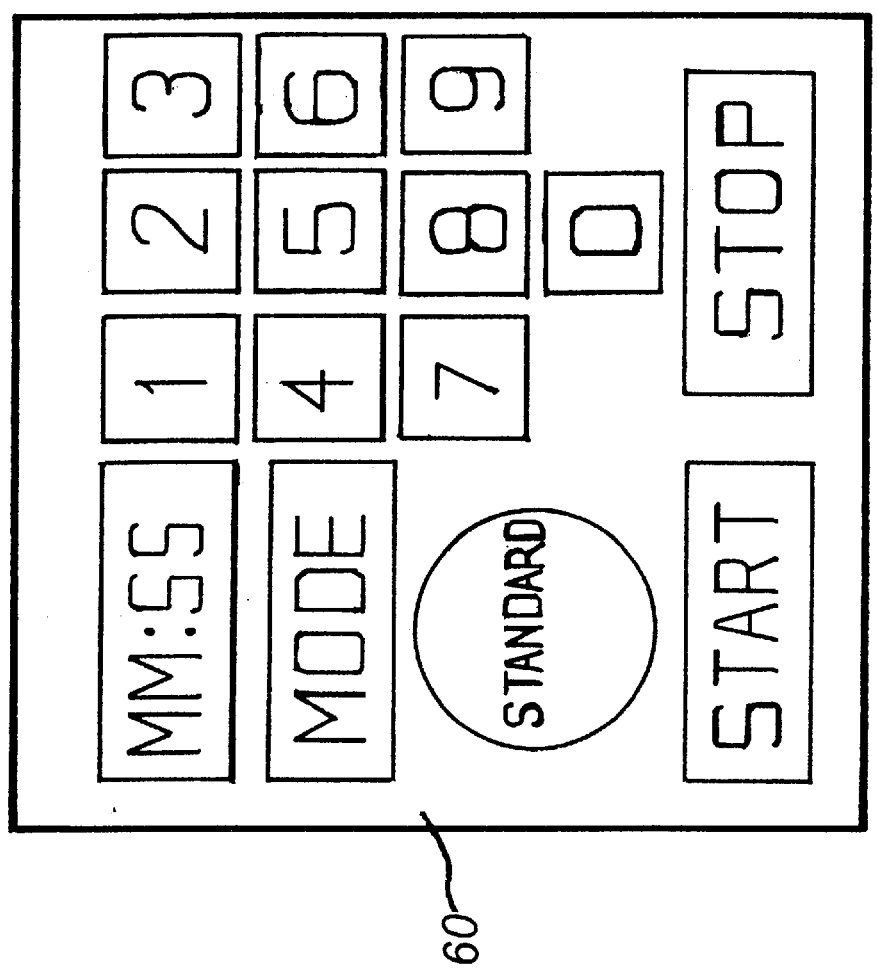
FIG. 1A: Keypad for Mobile Microwave Oven
Figure 2:
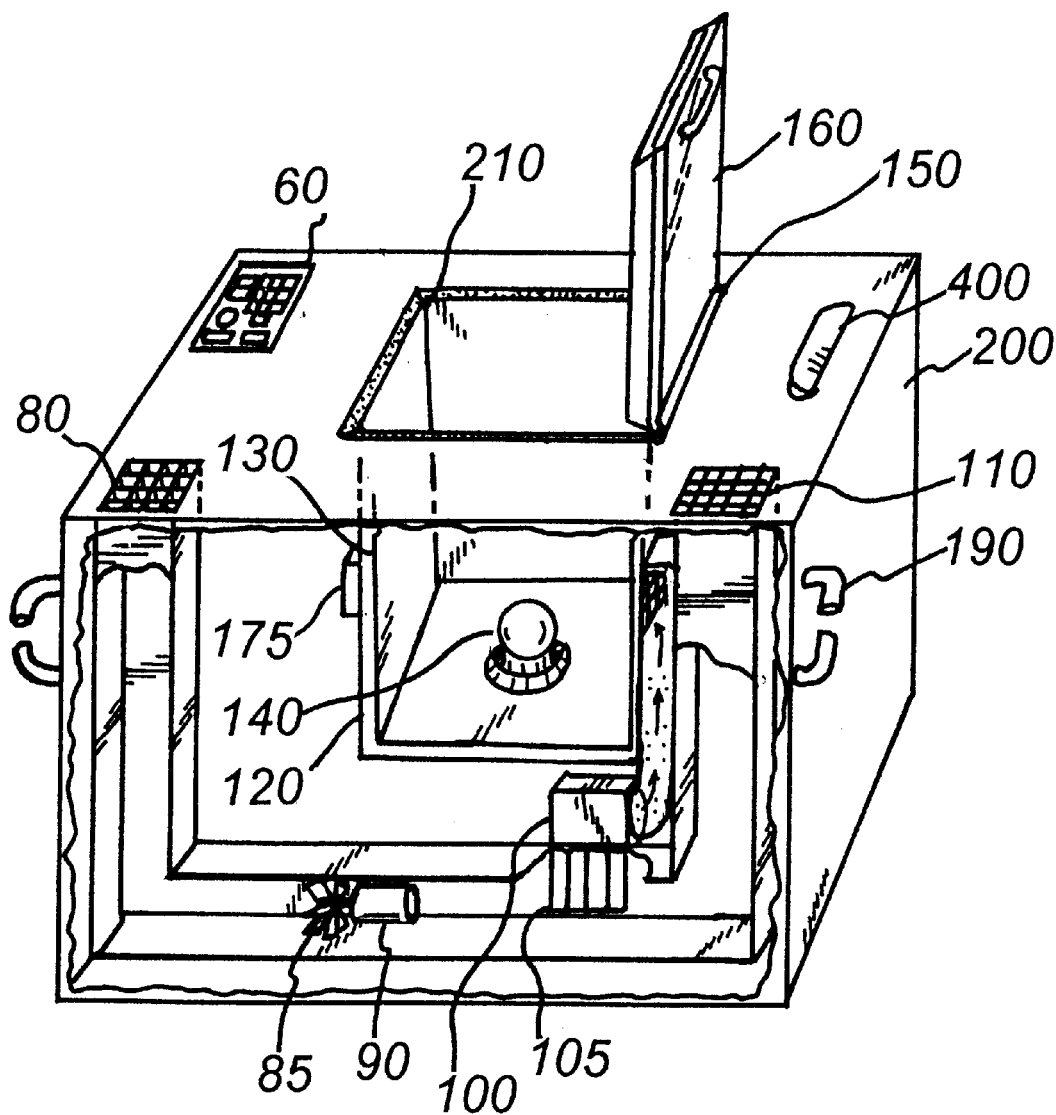
FIG. 2: Mobile Microwave Oven Interior
Figure 3:
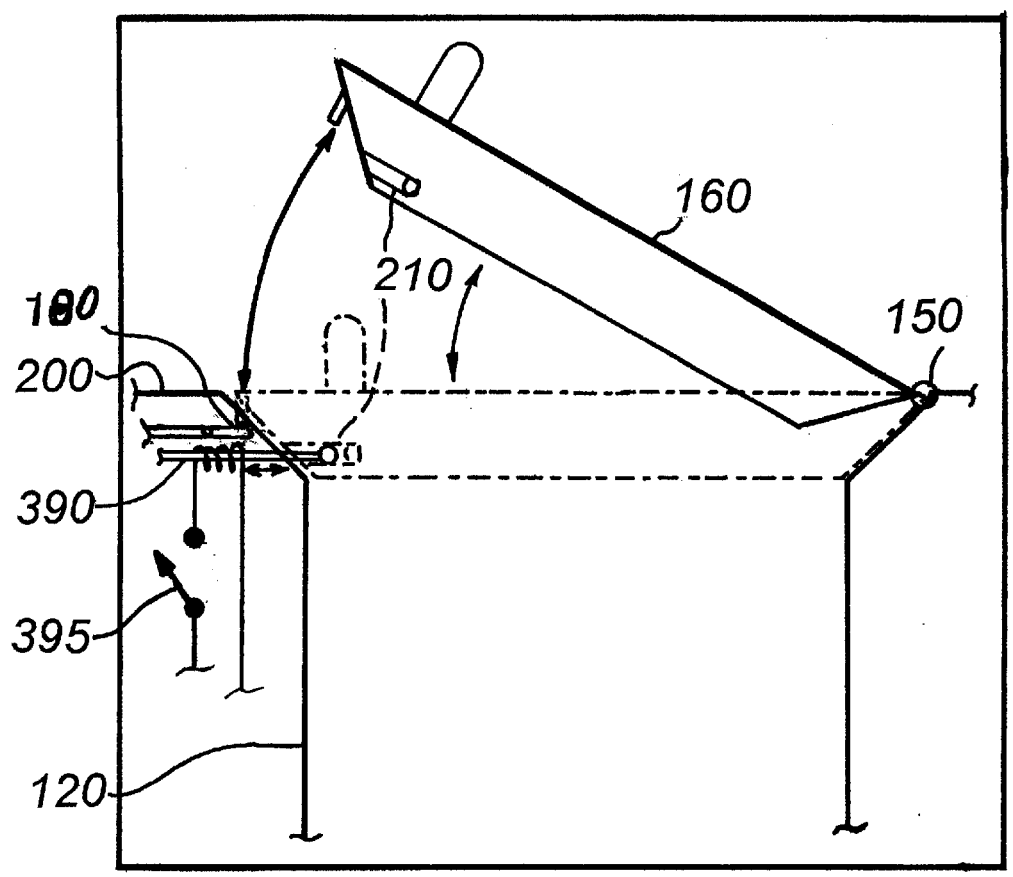
FIG. 3: Mobile Microwave Oven Door, Door Locking Solenoid, and Interlock

The SYSTEM CONTROLLER (50) is a microprocessor with associated RAM and ROM and input buffers and output drivers adequate for operation. Power is taken from VOLTAGE REGULATOR (30) which also serves to isolate and decouple the SYSTEM CONTROLLER (50) and related components from transients that occur in vehicle power systems. Inputs to the SYSTEM CONTROLLER (50) are: Input Voltage Reading Vr output by A/D CONVERTER (70), Input Current Reading Ir developed by CURRENT SHUNT (20) and A/D CONVERTER (75), ACCELEROM signal output by ACCELEROMETER (300), LOGIC CLOCK output by CLOCK GENERATOR (350), INTERLOCK SIGNALS from the DOOR CLOSED INTERLOCK SWITCH (180) and the OVER TEMPERATURE SENSOR (175) (FIG. 2), and KEYSTROKE DATA generated by CONTROL KEYPAD AND DISPLAY (60) (FIGS. 1, 1A, and 2).

Responsive to (a) the ACCELEROM signal from the ACCELEROMETER (300), (b) the INTERLOCK SIGNALS from the DOOR CLOSE INTERLOCK SWITCH (180), and (c) other sensor signals, e.g., the Vr output from the A/D CONVERTER (70) and the Ir output developed by the A/D CONVERTER (75) and CURRENT SHUNT (20), the SYSTEM CONTROLLER (50) shuts down the present MICROWAVE OVEN in the event of a hazardous or fault condition. For instance, the MICROWAVE OVEN normally shuts down if the vehicle is involved in a collision.

Since this is a relatively low-power microwave oven, heating times are longer than those of conventional, more powerful microwave ovens typically found in kitchens. The microwave oven described here has power input to the cavity (120) of approximately one fourth of the power found in typical kitchen microwave ovens. Most people who use a microwave oven are familiar with "standard" heating times. These familiar times must be multiplied by a factor of approximately four in order to be correct for the lower power level of the present microwave oven. If a "standard" heating time is entered via the CONTROL KEYPAD AND DISPLAY (60), the SYSTEM CONTROLLER (50) multiplies the time by four in order to warm the food to the proper temperature. Since longer intervals allow more cooling by radiation and convection, a manufacturer might adjust the time further with a lookup table or algorithm based on empirical results. A surface pyrometer or other temperature sensor could also signal that desired temperature has been reached.

The CONTROL KEYPAD AND DISPLAY (60) generates unique digital signals in a format suitable for input to the SYSTEM CONTROLLER (50), whenever a key is pressed. This subsystem also contains display drivers which cause symbols and digits to appear in the multi-segment multi-character alphanumeric display when appropriate data is received from the SYSTEM CONTROLLER (50).

DESCRIPTION OF OPERATION

Referring to all of the figures, the present low-power microwave oven is placed in a seat in a vehicle. The waist belt portion of the seatbelt corresponding to that seat is passed through the SPLIT LOOPS (190). The waist belt is tightened down to secure the CABINET (200) in the seat.

The PLUG (10) is inserted into the "cigarette lighter" or "accessory power" socket of the vehicle in order to obtain 12 VDC power. The VOLTAGE REGULATOR (30) regulates the 12 VDC input to +5 VDC required by the SYSTEM CONTROLLER (50) and the CLOCK GENERATOR (350).

The DOOR (160) of the MICROWAVE CAVITY (120) swings open on HINGE (150). The user places the food or other substance to be heated in a "microwave safe", radio-transparent heating container (141) with a locking vented lid. See FIG. 5A. If the heating container (141) has a mating recess molded into the bottom, the container can be "popped" onto the DETENTED RETAINER STUD (140). If there is no retaining component on the heating container (141) the PLASTIC LINER WITH INVERTED PYRAMIDAL WELL (145) is used. See FIG. 5. This component (145), made of dishwater-safe, radio-transparent, heat-resistant plastic, is simply placed in the microwave oven CAVITY (120) in place of the PLASTIC LINER (130). The food container (141) described above is placed as far down into the well as it will go, thus retaining it in most situations. The DOOR (160) is closed. The SPRING LATCHING PIN (175) is captured by the RETAINING SPRING CATCH (170) and pressing on DOOR INTERLOCK SWITCH (180) which closes, sending a logic level signal to the SYSTEM CONTROLLER (50).

The user enters the length of time the food is to be heated. If the user presses "STANDARD" on the CONTROL KEYPAD AND DISPLAY (60), the SYSTEM CONTROLLER (50) multiplies by a factor which compensates for the low-power feature of this microwave oven. Typically this factor will be in the range of 2–6. If the user does not press the "STANDARD" key, the time entered and not multiplied represents the exact heating time.

The user presses the "START" key on the CONTROL KEYPAD AND DISPLAY (60). The SYSTEM CONTROLLER (50) looks at all input signals after receiving the "START" signal. The following signals must be present:
INTERLOCKS: DOOR INTERLOCK SWITCH (180) (FIG. 3) actuated by closure of cavity DOOR (160) in series with OVER TEMPERATURE SENSOR (175) pulls INTERLOCKS" line to ground.
  Vr: Voltage reading from A/D CONVERTER (70) must be above minimum acceptable battery voltage, nominally 11.5 volts.
  Ir: Current reading from AID CONVERTER (75) must be below maximum current rating of power socket in vehicle, set by manufacturer as a function of intended usage, nominally 15 amperes in a small car, and as high as 30 amperes in some larger trucks.

If not all conditions are satisfied, a "BEEP" command is sent to the piezoelectric annunciator to inform the user. For example, the MICROWAVE OVEN of the invention shuts down, i.e., does not go into operation, if the battery voltage is at or below the typical minimum value, again nominally 11.5 volts, needed to start the vehicle. Likewise, the present MICROWAVE OVEN shuts down if the current from the A/D converter (75) is at or above the maximum current rating of the power socket. If all conditions are satisfied the SYSTEM CONTROLLER (50) begins the heating of the food in its heating container (141). This is commanded by outputting the following signals and causing the following actions:

PS ENABLE: This signal enables SWITCHING POWER SUPPLY (40) operation.

PS CLOCK: This signal drives the power switching circuits in the SWITCHING POWER SUPPLY (40) thus supplying filament voltage 3 VAC as well as negative high voltage B- to the cathode (filament).

MAG FAN ON: This signal drives the switch transistor (92) which causes the DC FAN MOTOR (90) to turn the attached FAN BLADES (85). This draws air in through top-mounted cooling air intake and circulates it through the attached intake plenum past the DC FAN MOTOR (90) through the MAGNETRON ANODE THERMAL RADIATOR (105) and exhausts it via the exhaust plenum through top-mounted COOLING AIR OUTLET (110).

LOCKDOOR: This signal actuates the DOOR LOCK SOLENOID (390) by driving the switch transistor (395). As a result, the CAVITY DOOR (160) is prevented from springing open while the vehicle is in motion and releasing microwave energy into the vehicle.

After the inputted time interval has elapsed the SYSTEM CONTROLLER (50) ceases outputting all the signals necessary for the heating to occur and the DOOR (160) is unlocked. If any of the signals required by the SYSTEM CONTROLLER (50) are lost, the SYSTEM CONTROLLER (50) ceases outputting the signals required for heating to occur.

The preferred embodiment described demonstrates the advantages of the invention. Variations on the embodiment described can be made to accommodate different installation configurations. For example, the DETENTED RETAINER STUD (140) could be moved to one of the four other stationary CAVITY (120) walls, enabling a conventional "front-opening" microwave oven with a vertical HINGE (150).

What is claimed is:

1. A microwave oven for placement on a seat of a vehicle operable to transport at least one person, the seat being provided with a seatbelt, the vehicle having an accessory power socket that provides DC power to a person-receiving region of the vehicle, the oven comprising:
    a cabinet having a top surface, a bottom surface, and side surfaces that extend between the top and bottom surfaces;
    securing means provided along the side surfaces of the cabinet for receiving the seatbelt to secure the oven to the seat;
    a microwave heating cavity located inside the cabinet and having radio-reflecting walls;
    a cavity door provided in the top surface of the cabinet for accessing the cavity;
    a magnetron for providing microwave energy to the cavity;
    a power supply that receives DC power from the accessory power socket and provides DC power to the magnetron; and
    a control keypad and display for controlling microwave heating in the oven.

2. A microwave oven as in claim 1 wherein the control keypad and display are provided along the top surface of the cabinet.

3. A microwave oven as in claim 1 further including cooling air intake and outlet vents provided along the top surface of the cabinet.

4. A microwave oven as in claim 1 further including a controller for preventing or/and terminating heating in the oven if the DC power provided by the accessory power socket is at a current above a specified current value or/and at a voltage below a specified voltage value.

5. A microwave oven as in claim 1 further including a controller for causing the oven to terminate operation if the vehicle undergoes a collision.

6. A microwave oven as in claim 1 further including a locking mechanism for preventing the cavity door from opening when the vehicle is moving.

7. A microwave oven as in claim 1 further including heating-time multiplying means for multiplying a heating time inputted to the control keypad and display by a factor greater than one to determine a heating time for the oven.

8. A microwave oven as in claim 1 further including a removable radio-transparent liner that fits closely into the heating cavity, covers its bottom wall, and extends at least partially up its side walls.

9. A microwave oven for placement in a person-receiving region of a vehicle operable to transport at least one person, the oven comprising:
    a cabinet having a top surface, a bottom surface, and side surfaces that extend between the top and bottom surfaces;
    a microwave heating cavity located inside the cabinet and having radio-reflecting walls;
    a cavity door for accessing the cavity;
    a magnetron for providing microwave energy to the cavity;
    a control keypad and display for controlling microwave heating in the cavity; and
    cooling air intake and outlet vents provided along a specified one of surfaces of the cabinet, the cavity door and control keypad and display also being provided along the specified surface of the cabinet.

10. A microwave oven as in claim 9 wherein the specified surface of the cabinet is its top surface.

11. A microwave oven as in claim 9 further including a locking mechanism for preventing the cavity door from opening when the vehicle is moving.

12. A microwave oven as in claim 9 further including:
    an intake plenum situated inside the cabinet and terminated at the intake vent;
    an outlet plenum situated inside the cabinet and terminated at the outlet vent;
    a DC motor having a shaft;
    a set of fan blades affixed to the shaft; and
    a magnetron anode thermal radiator, the fan blades drawing air in through the intake vent and into intake plenum, propelling air through the thermal radiator, and causing air to pass through the outlet plenum and out the outlet vent.

13. A microwave oven as in claim 9 wherein the oven is placeable on a seat in the vehicle, the seat being provided with a seatbelt that contacts the side surfaces of the cabinet.

14. A microwave oven as in claim 13 further including securing means provided along the side surfaces of the cabinet for receiving the seatbelt to secure the oven to the seat.

15. A microwave oven for placement in a person-receiving region of a vehicle operable to transport at least one person, the oven comprising:
- a cabinet;
- a microwave cavity located inside the cabinet and having radio-reflecting walls;
- a cavity door for accessing the cavity;
- a magnetron for providing microwave energy to the cavity;
- a power supply that receives DC power from the vehicle and provides DC power to the magnetron;
- a control keypad and display for controlling microwave heating in the cavity; and
- a controller for preventing or/and terminating heating in the oven if the DC power received by the power supply is at a current above a specified current value or/and at a voltage below a specified voltage value.

16. A microwave oven as in claim 15 wherein the vehicle has an accessory power socket that provides DC power to the vehicle's person-receiving region, the controller receiving DC power from the accessory power socket.

17. A microwave oven as in claim 16 wherein the specified voltage value is approximately the minimum voltage needed to reliably start the vehicle.

18. A microwave oven as in claim 16 wherein the specified current value is approximately the maximum current that can flow through a fuse for the accessory power socket without blowing the fuse.

19. A microwave oven as in claim 16 wherein the accessory power socket comprises a cigarette lighter socket.

20. A microwave oven as in claim 15 wherein the vehicle comprises a tire-based motor vehicle or a boat.

* * * * *